United States Patent [19]
Penth

[11] Patent Number: 5,435,920
[45] Date of Patent: Jul. 25, 1995

[54] METHOD OF SEPARATING EMULSIONS

[76] Inventor: Elfie Penth, St. Barbara Str. A, D-66822 Lebach, Germany

[21] Appl. No.: 87,740

[22] PCT Filed: Jan. 14, 1992

[86] PCT No.: PCT/EP92/00056
§ 371 Date: Sep. 10, 1993
§ 102(e) Date: Sep. 10, 1993

[87] PCT Pub. No.: WO92/13051
PCT Pub. Date: Aug. 6, 1992

[30] Foreign Application Priority Data

Jan. 15, 1991 [DE] Germany ............... 41 00 964.9
Jan. 25, 1991 [DE] Germany ............... 41 02 175.4
Oct. 7, 1991 [DE] Germany ............... 41 33 160.5
Oct. 29, 1991 [DE] Germany ............... 41 39 385.6
Oct. 29, 1991 [DE] Germany ............... 41 35 578.4

[51] Int. Cl.$^6$ .................. C02F 1/36; C02F 1/48; B01D 17/05
[52] U.S. Cl. .................. 210/708; 210/737; 210/748; 210/774; 252/330; 252/346; 252/348
[58] Field of Search ............ 210/708, 748, 774, 737; 252/330, 346, 348; 204/149

[56] References Cited
U.S. PATENT DOCUMENTS

| | | | |
|---|---|---|---|
| 3,594,314 | 2/1969 | Bilhartz et al. | 210/708 |
| 3,595,787 | 7/1971 | Sheikh | 210/708 |
| 3,673,065 | 6/1972 | Anderson | 210/708 |
| 3,826,725 | 7/1974 | Schick et al. | 210/708 |
| 4,081,338 | 3/1978 | Golovoy | 210/708 |
| 4,194,972 | 3/1980 | Weintraub et al. | 210/708 |
| 4,483,695 | 11/1984 | Covey, Jr. | 210/708 |
| 5,167,829 | 12/1992 | Diamond et al. | 210/708 |

FOREIGN PATENT DOCUMENTS

| | | |
|---|---|---|
| 1023677 | 1/1978 | Canada . |
| 2317234 | 2/1977 | France . |
| 225916 | of 0000 | Germany . |
| 2638516 | 3/1977 | Germany . |
| 2910314 | 10/1980 | Germany . |
| 3700826 | 7/1988 | Germany . |
| 3723745 | 9/1988 | Germany . |
| 3739580 | 6/1989 | Germany . |
| 3916030 | 11/1990 | Germany . |
| WO86/01124 | 2/1986 | WIPO . |
| WO86/01233 | 2/1986 | WIPO . |

Primary Examiner—Neil McCarthy

[57] ABSTRACT

A process is disclosed for cleaving spent emulsions such as cooling lubricants by means of carbon dioxide under pressure, and if necessary, heat in an economic and environment-friendly manner. The emulsion of cooling lubricant is saturated under pressure with carbon dioxide and is heated and/or cooled until cleavage is achieved. Above the cleavage temperature, a floating, water-poor oil phase quickly forms above an oil-poor aqueous phase.

18 Claims, 1 Drawing Sheet

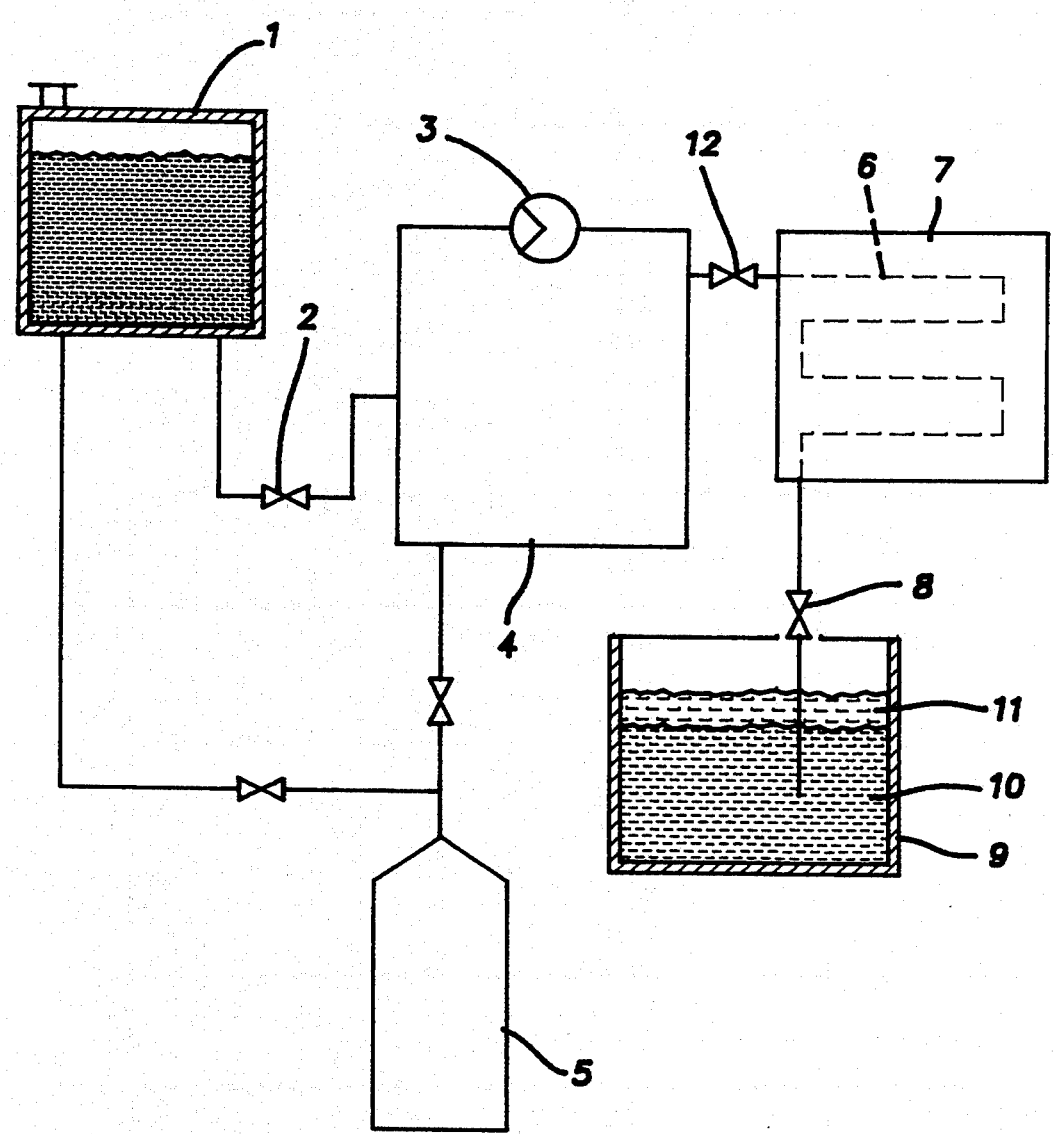

METHOD OF SEPARATING EMULSIONS

The invention relates to a method of separating emulsions, dispersions or the like in a floating organic and an aqueous phase.

The invention is capable of use for all emulsions, suspensions and dispersions, such as arise in the partial de-ratting (fat removal) production of food stuffs, in waste water from the production and treatment of dyes and lacquers, the manufacture of leather and textiles, as well as in the pharmaceutical and cosmetic industries.

Oil-in-water emulsions are employed in metal machining as combined coolants and lubricants. In such a use the stability of these emulsions represents an important criterion for their usefulness. Mostly compositions of anionic and non-ionic tensides serve as the emulsifying agents. In the course of use foreign materials such as dirt and bacteria enter the emulsions, altering their characteristics and rendering them unusable. After which the emulsion must be passed for re-treatment.

Herein most cases attempts are made by separating the emulsion into an oil phase and a water phase, to reduce the quantity to be re-treated. In the separation one can distinguish basically between physical methods (adsorption), thermal methods (combustion, heating, vapourising), chemical methods (acid separation, salt separation, separation by organic polymers), electrochemical methods (formation of hydroxides of multivalent metals from sacrificial anodes) and mechanical methods (centrifuging, flotation, filtering through membranes).

Of these methods, some are excluded with regard to their possible employment for the separation of the emulsion of the very stable coolant/lubricant currently in use in the machining of metals. Amongst these are physical methods such as adsorption as well as mechanical methods of centrifuging and flotation. Amongst the thermal methods only vaporisation is found to be capable of use, but it is not practical because of the very high energy requirements and the incrustation problems which arise, whereas in the case of stable emulsions, simple heating does not lead to separation. Combustion is impossible on account of the resulting "steam distillation".

The separation of emulsions by the use of acids or salts does not succeed with all emulsions. Quite apart from the costs involved for the chemicals required, a chief disadvantage is the high salt content arising in the waste water on neutralisation. It is true that the waste water situation is found to be free of problems when the chemical separation of the emulsions is performed by means of very expensive polyelectrolytes.

A modification of the chemical methods is represented by the electro-chemical methods, in which emulsion-separating hydroxide flakes or precipitates are produced by the anodic solution of multi-valent metals, chiefly iron and aluminium. By this process, which is also really expensive, contamination of the waste water by salts is largely avoided. All the same a drawback is the quantity of aqueous sludges produced.

In recent times electrical methods have been proposed, but their usefulness in practice has still not been tested.

Amongst the mechanical methods the filtration by membranes has become established in recent years. Whilst without auxiliary means a filtrate which is capable of use is produced, the retained portion can however only be concentrated to an oil content of about 40%.

It is the aim of the present invention to find a method by which the spent coolant/lubricant, but also other emulsions, dispersions and suspensions, can be separated in an environmentally acceptable manner, with minimum outlay on auxiliary means, and can be recycled for further use.

This problem is solved according to the invention in that the emulsion, which apart from auxiliary means comprises substantially oil, water and an anionic emulsifier or a combination of emulsifiers of anionic and non-ionic tensides, is either saturated with carbon dioxide under pressure or exposed to water containing carbonic acid and is separated by subsequent slow heating and/or cooling into an organic and an aqueous phase.

The protons of the carbonic acid cause a neutralisation of the charge on the emulsified droplets and cause the emulsion to break-up during the slow heating.

The floating oil phase is mostly clear and almost free of water. It can accordingly be easily separated off and cleaned. As soon as the oil phase is stirred together with aqueous lye (metal hydroxide) one again obtains a stable emulsion.

On account of the high security in use, with regard to the residual oil content in the filtrate, filtration through a membrane has been found to be ideally suitable, in combination with the method according to the invention. Equally entirely suitable for subsequent treatment of the water which has been separated off, and with its low oil content, are the electro-chemical methods as the resulting quantities of sludge are now only very small.

In the method according to the invention the principle of the hitherto frequently employed "acid separation" is followed. In this known conventional "acid separation" either strong acids themselves are used to act or their acid salts, e.g. aluminium trichloride, to cause a strong shift in pH into the acid region.

In such an arrangement the neutralisation of the waste water, which follows the separation, on account of the large quantities of acid necessary for the separation, leads to a significant proportion of salts in the waste water from the separation process. For these reasons the "acid separation" is no longer accepted today.

The method according to the invention is based on the consideration that for separating the emulsion it is true that a strong acid must be made available, but in the final reckoning the maintenance of the separation, once achieved, does not depend on a low pH value. In such an arrangement the realms for this lie in the nature of the charge distribution and the change on separation: thus in the production of an emulsion (micelle formation) the tensides with the hydrophilic groups do not settle externally around the oil droplets. In this arrangement the particular stability of these emulsions is based on the combination of the ionogenic and non-ionogenic kinds of tenside. The polar groups of the non-ionogenic tenside are, in comparison with those of the anionic tenside, very much greater, and act against mutual approach of two micelles as a requirement for flowing together. Furthermore, this mutual approach is prevented in a decisive manner by the anionic tensides. The carboxylate or sulphate groups anchored to the surfaces of the micelles, by the lipophilic part of the molecule, form a negative screen around the micelle. The charge on this tenside layer is neutralised partly by opposite ions in the shield itself and partially by opposite ions outside the shield. These opposite ions are not bonded to the micelles and can diffuse freely. The effective charge on the micelles is therefore reduced by the opposite ions adsorbed onto the shield.

It is precisely this effective charge (zeta potential) that is the second decisive factor for mutual impact of the micelles. In the acid separation the degree of protolysis of the anionic tenside is reduced by the lowering of the pH and thereby the zeta potential is lowered and ultimately effects a break-down of the emulsion. Accordingly after the separation has taken place the maintenance of the lowered pH value is not necessary.

The particular feature or uniqueness of separation of emulsions by means of carbonic acid is therefore based just in the reduction of the degree of protolysis of the anionic tensides by means of protons without a corresponding effective lowering of the pH value being necessary. The basis for this lies in the fact that carbonic acid, according to its acid constant, represents a middle-strength acid with a pk=1. At pH=3.3 therefore, the stronger acid results from the carbonic acid and it is only the emulsion which is converted by the anionic tensides. At the same time this results in only carbon dioxide and water, with less $H_2CO_3$ molecules, so that under normal conditions the carbonic acid proportion is very low and so the waste water from the production of foodstuffs is absolutely safe.

In the process according to the invention at temperatures generally between 50° and 80° C. the heating of an emulsion exposed to carbonic acid under elevated pressure in this way leads to a break-down of many commercially available emulsions of an anionic/non-ionic type. In such a process the rising of gas bubbles from excess carbon dioxide leads to an acceleration of the break-down process and a rapid flotation of the oil phase.

Predominant is the fact that for separating coolant-/lubricants and other emulsions the fluid to be treated is first saturated with carbon dioxide and subsequently heated. However, also the treatment step of heating can be put ahead of the treatment with carbon dioxide. With equally good separation results in this way part of the carbon dioxide which has to be introduced can be saved. This is possible according to the invention in that the emulsion to be separated only needs to have added to it as much carbon dioxide as is necessary for the separation. In this way an unnecessary high carbon-dioxide-wasting final pressure in the separation vessel can be avoided.

In this process there is a complete elimination of the addition of any further chemicals. This is possible because under the conditions of separation by means of carbon dioxide a pH value of up to 3.3 is set, whereby the carbonic acid, as the now stronger acid, can drive the tenside out of its salt. There is accordingly formed the congugate organic acid of the tensile as bicarbonate.

After the emulsion has been broken down under this pH condition and under elevated temperature, the system can be relaxed. In the relaxed condition the pH value of the carbonic acid rises again to the "normal value" so that in reverse the organic acid is now more strongly acid that the carbonic acid and accordingly drives the latter from its salt, namely the bicarbonate. Accordingly, the original tenside and carbonic acid are re-created. As the carbonic acid in the form of the escaping carbon dioxide is completely removed from the equation, again with stirring and heating, this process therefore also runs back again to the original starting point, namely a tenside-stabilised emulsion.

It is however, also possible, after reduction of the pH value by introduction of carbonic acid at elevated pressure instead of the raising of the temperature described above for introducing the separation process, to provide another way of introducing the energy. In such an arrangement there is provided primarily the use of ultra-sound, but alternatively also a simultaneous use of elevated temperature and ultra-sound.

Whilst the separation of emulsions using ultra-sound must be regarded as a known method for certain emulsions, the separation of stable emulsions such as the currently commercially employed coolant/lubricants, is not successful using this method. As described above the separation of these also fails using heat or carbon dioxide alone.

Hitherto not known is the separation of emulsions according to the invention by means of the simultaneous use of carbon dioxide and ultra-sound. Likewise not known is the simultaneous use of carbon dioxide, ultra-sound and thermal energy.

However, in this way the currently usual coolant/lubricants can be separated.

The process can be operated continuously or in batches.

A possible embodiment of an installation for carrying out the process according to the invention comprises a carbonic acid enrichment portion, in which the emulsion is enriched with carbonic acid at an excess pressure from 4 to 10 bar, and a correspondingly pressure-tight vessel which is equipped with sonic rods and possible electric heating (up to 100° C.).

Used cooling and lubricating medium can also be separated according to the invention by means of carbon dioxide and electric treatment.

In the electric breakdown of oil-in-water emulsions two different principles are known, namely breakdown with the aid of electric current (JP 59 196 795; JP62 83 087; DD 225,916; SU 1,411,290; DE 37 23 745; SU 1,411,289) and breakdown with the aid of electric voltage (SU 1,411,289; SU 1,274,717; Hano Tadashi and others, J. Chem. Eng. Jpn. 1988, 21(4), 345–51; G. A. Davies CHEMSA 1982, 8(2), 6–7).

In the electrolytic treatment the emulsion is electrolised. According to the electrode material which is employed the breakdown is based on the principle of electro-flotation or the principle of electro-flocculation.

In electro-flotation electrode material is employed which remains inert to the emulsion, and in JP 59 196 795 porous carbon electrodes are proposed, and in JP 62 83 087 a lead anode. In DE-A-29 10 314 and DE-A-37 39 580 the electrode chambers are separated from one another by a diaphragm resulting in efficient separation.

In electro-flocculation sacrificial anodes made of iron or aluminium are employed (DD 225 916; WO86/01124; WO86/01233; DE 37 00 826 A1). In the ideal case these release iron or aluminium hydroxide flakes which breakdown the emulsion.

In the process of coalescence in an electric field, emulsified oil droplets coalese in the electric field. In recent work conductors coated with plastics (SU 1 274 717) or with glass (Hano Tdashi and others J. Chem. Eng. Japan 1988, 21(4) 345 51) are employed as the electrodes. DE 37 17 633 A1 works with simple electrodes but very low voltage so that instead of electrolysis, only coalescence takes place in the electric field.

According to the present invention a stable coolant/lubricant can also be separated by means of carbon dioxide and electric energy. The advantage over the use of thermal energy lies—depending on the emulsion to be separated—in many ways in a saving in energy, and acceleration in the time necessary for separation or in an increased security of use of the separation.

The particular feature of this lies in the fact that means of the carbon dioxide/electrical energy combination it is possible to separate emulsions which can only be separated using an electrical process alone either with a substantially greater outlay or very badly.

The basis for the increased separability by means of electrical energy with the simultaneous use of carbon dioxide under pressure lies in the substantial destablisation of the emulsion by the strong pH-lowering action of the compressed carbonic acid, as described in detail above.

In this connection, as the electric component of the process, as well as electro-flotation and electro-coagulation in an electric field, also electro-flocculation comes into consideration. In fact it has been shown that by the pH lowering action of the compressed carbonic acid a de-stabilising action on the emulsion is obtained such that the coolant/lubricant, which is really difficult to separate, is capable of separation with direct current and also using alternating current of different voltages. In particular the problem of the repeatedly arising re-emulsification is not found using the present process.

An embodiment, preferred on account of its simple construction of an installation for carrying out this process is constructed as follows:

Two titanium anodes are secured spaced apart by five cm in a closed vessel which is to be filled with emulsion. The emulsion is subjected to a flow of carbon dioxide from below through a porous ceramic tube and is enriched with carbonic acid under the excess pressure which builds up. A pressure relieve valve in the upper part of the vessel is set to blow off at 6 bar. After the application of an alternating voltage of 20 volts at 50 hertz to the electrodes a coolant/lubricant emulsion is separated completely in a few minutes with the formation of gas. The water phase which arises in this process is completely clear and can be fed into the public waste water system without problems, on account of its residual oil content of less than 10 mg/l.

By the invention oil-in-water emulsions are separated, of which the stability permits no separation or only incomplete separation of coalescing filters and adsorption media such as active carbon. The process according to the invention benefits for this purpose from a pre-treatment by means of carbon dioxide to weaken the stability of the emulsion and a subsequent treatment by means of coalescence filters and adsorption media to form a water phase capable of introduction into the sewage system.

For the preparation of certain emulsions which are not too stable, such as for example condensate from compressed air, apparatus is known which separates out free oil in a first stage, whereupon the emulsion is conducted through a coalescence filter and finally it is freed from the remaining particles of oil by means of an adsorption medium.

In many cases this arrangement is sufficient for an effective separation of oil from water, but it is not sufficient so that oil contents under 20 ppm in the water phase can be achieved.

Accordingly, such stabilised emulsions cannot be effectively treated with the apparatus described above. Since for small quantities of emulsion, such as for example a rise in many compressed air installations, expensive technical solutions such as ultra-filtration or chemical metering devices cannot be considered, a technically simple and economical solution for the treatment of these emulsions has been found.

The aim which was sought was achieved by treatment of the emulsions or the like for separation with carbon dioxide, subsequent treatment with a coalesence filter and further handling with an adsorption medium such as active carbon.

In detail the emulsion to be separated is first impregnated with carbon dioxide at a pressure of preferably 1 bar (atmospheric pressure) up to a maximum of about 6 bar. Thereupon the emulsion is conducted over a means for precipitating light fluid, a coalesence filter and an adsoption medium.

In contrast to the process without carbon dioxide the oil contents of the water phase which is produced are significantly reduced. Whereas the treatment of the emulsion with light fluid precipitating means, coalescence filter and adsoption, media such as active carbon, leaves behind, in the water phase, residual contents far above the legal limiting value for freed disposal of, the pre-treatment with carbon dioxide leads to oil contents below the legally permitted maximum values. Overall we are concerned with a technically simple process which can be introduced economically even for small quantities of corresponding waste water.

For separation of oil-in-water emulsions one can also first saturate them at room temperature with carbon dioxide gas under pressure and subsequently cool them down to their freezing point. After thawing out of the frozen material a phase separation of the aqueous from the organic phase takes place.

An advantage in such a process is the low energy input in the event that a heat exchange for recovering heat is not justified on the basis of the size of the installation or on the basis of corresponding surround circumstances, e.g. batch operation of the installation leading to varying low outside temperatures.

This process can also be run continuously, in that the material to be separated is first impregnated with carbon dioxide, then frozen in a continuously operating electric ice-making machine and then is thawed out again making use of the heat produced in the ice-making machine.

For cleaning oily or fatty parts the parts are first washed with a water-based cleaning medium. The cleaning medium is, according to the invention received from the start in such a way that the emulsion of cleaning medium, oil or fat and water, with carbon dioxide, which arises in the cleaning process can be easily rinsed away. In this connection the phase's easy rinsability is to be understood as meaning that the emulsion saturated under pressure with carbon dioxide has to be heated either only very little or not at all up to phase separation. The rising organic phase is skimmed off or separated out through an oil separator. The water phase is cleaned up with a fresh cleaning medium and is re-used. As a cleaning medium anionic tensides such as carboxylate, sulphate or sulphonate or metal hydroxides or combinations of these are employed.

In the parts-washing installations which are currently used today the oil-containing washing liqours which arise are either taken away as special waste or are treated in accordance with the known methods for separating emulsions. The drawbacks arising in this connection are fully described above. Such emulsions can also be separated using carbon dioxide and heat.

According to the invention it is therefore further proposed that the emulsion to be separated, is optimised to ease separability, this should be produced by selecting the cleaner acting as a de-emulsifier so that the emulsion arising with the oil or fat has the least possible stability in relation to separation with carbon dioxide and heat. In this connection this emulsion cannot be separated by heat alone as the washing process itself is preferably operated at an elevated temperature. As a cleaning medium anionic tensides such as carboxylate, sulphonate, sulphate, metal hydroxides or combinations of these are employed. Non-ionic or cationic tensides are, as a rule, less suitable.

The separated water phase arising from the separation can, according to the invention, be sharpened up with cleaning media and recycled as a cleaning medium. An addition of salt to his water phase in the circuit can be counteracted if the cleaning medium presents as an ion pair, the cation selected so that in the treatment with carbon dioxide, a carbonate of limited solubility is formed. For example, calcium forms, with carbon dioxide, produce calcium carbonate. The carbonate precipitated from the separated water phase passing through the circuit, can be removed continuously together with the floating oil phase or by filtering out.

BRIEF DESCRIPTION OF THE DRAWING

The functional sequence of the process according to the invention is illustrated diagrammatically in the drawing in conjunction with an embodiment by way of example of a separating installation.

An emulsion to be separated is conducted from a pressure-tight vessel 1 through a valve 2, for instance a non-return valve, into a circuit 4 serving for enrichment with carbonic acid. The circuit 4 is supplied with carbon dioxide from a cylinder 5.

For thorough mixing to form a saturated solution, there is provided a circulating pump or peristaltic pump 3 which pumps the emulsion around the circuit 4 under pressure. A partial stream of the emulsion is conducted through a coil 6 which is heated with the aid of a thermostatically controlled vessel 7.

By means of an adjustable pressure-retaining throttle valve 8, the separated emulsion is drawn off into a vessel 9, where the water phase 10 and oil phase 11 separate out from one another.

A valve 12 in the form of a non-return valve is arranged between the circuit 4 serving to enrich with carbonic acid and the coil 6 serving to heat the emulsion which is to be separated.

I claim:

1. A method of separating an organic phase from an emulsified solution comprising:
    contacting said emulsified solution with carbon dioxide under elevated pressure, said elevated pressure being in a range from about 4 bar to about 10 bar, whereby the emulsified solution attains a pH from about 3.2 to about 3.7 adding an anionic tenside or a combination of anionic and nonionic tensides; and
    separating the organic phase from the emulsified solution whereby a water phase is obtained.

2. The method of claim 1, wherein said emulsified solution is a cooling/lubricating medium.

3. The method of claim 2, wherein the pH of the emulsified solution is approximately 3.3.

4. The method of claim 1, wherein said step of contacting with carbon dioxide is comprised of saturating said emulsified solution with carbon dioxide.

5. The method of claim 1, wherein said step of contacting with carbon dioxide is further comprised of dissolving said carbon dioxide in water to form carbonic acid, thereby exposing said emulsified solution to water containing carbonic acid.

6. The method of claim 4 or 5, further comprising heating said emulsified solution to a temperature in the range from about 50° C. to about 80° C.

7. The method of claim 4 or 5, further comprising cooling said emulsified solution slowly.

8. The method of claim 4 or 5, wherein the step of separating the organic phase is comprised of skimming off the organic phase.

9. The method of claim 4 or 5, wherein the step of separating the organic phase is comprised of filtering out the organic phase using a membrane.

10. The method of claim 4 or 5, further comprising treating said organic phase with a metal hydroxide to thereby form a corresponding carbonate of low solubility.

11. The method of claim 4 or 5, further comprising exposing said emulsified solution to ultrasonic waves.

12. The method of claim 4 or 5, further comprising treating the emulsified solution with a voltage applied to a first and a second electrode, simultaneously with the step of contacting with carbonic acid.

13. The method of claim 12, wherein said voltage is 220 v supplying either a direct or alternating electric current, said electric current being applied to a first and a second inert electrode, said first and second electrode being spaced a distance from about 2 cm to about 10 cm apart.

14. The method of claim 13, wherein said first and second electrodes are titanium electrodes.

15. The method of claim 13, wherein said first and second electrodes are dissolving sacrificial electrodes.

16. The method of claim 6, wherein said anionic tenside is a calcium salt selected from the group consisting of calcium carboxylate, calcium sulphate, calcium sulphonate, or calcium hydroxide.

17. The method of claim 16, further comprising cooling the emulsified solution to its freezing point and subsequently thawing the emulsified solution.

18. The method of claim 1, wherein said elevated pressure is no greater than 6 bar.

* * * * *

UNITED STATES PATENT AND TRADEMARK OFFICE
CERTIFICATE OF CORRECTION

PATENT NO. : 5,435,920
DATED : July 25, 1995
INVENTOR(S) : Elfie Penth

It is certified that error appears in the above-indentified patent and that said Letters Patent is hereby corrected as shown below:

On the title page, the following information should be inserted with respect to the assignee:

--Assignee: Berthold Koch, Neuss, Germany--.

Column 1, line 9, delete "de-ratting" and insert --de-fatting--.

Column 6, line 67, delete "liqours" and insert --liquors--.

Signed and Sealed this

Sixteenth Day of April, 1996

Attest:

BRUCE LEHMAN

*Attesting Officer*   *Commissioner of Patents and Trademarks*